April 30, 1929.  G. W. ENDERSON  1,711,308
APPARATUS FOR WATER RESERVATION
Filed Aug. 8, 1925
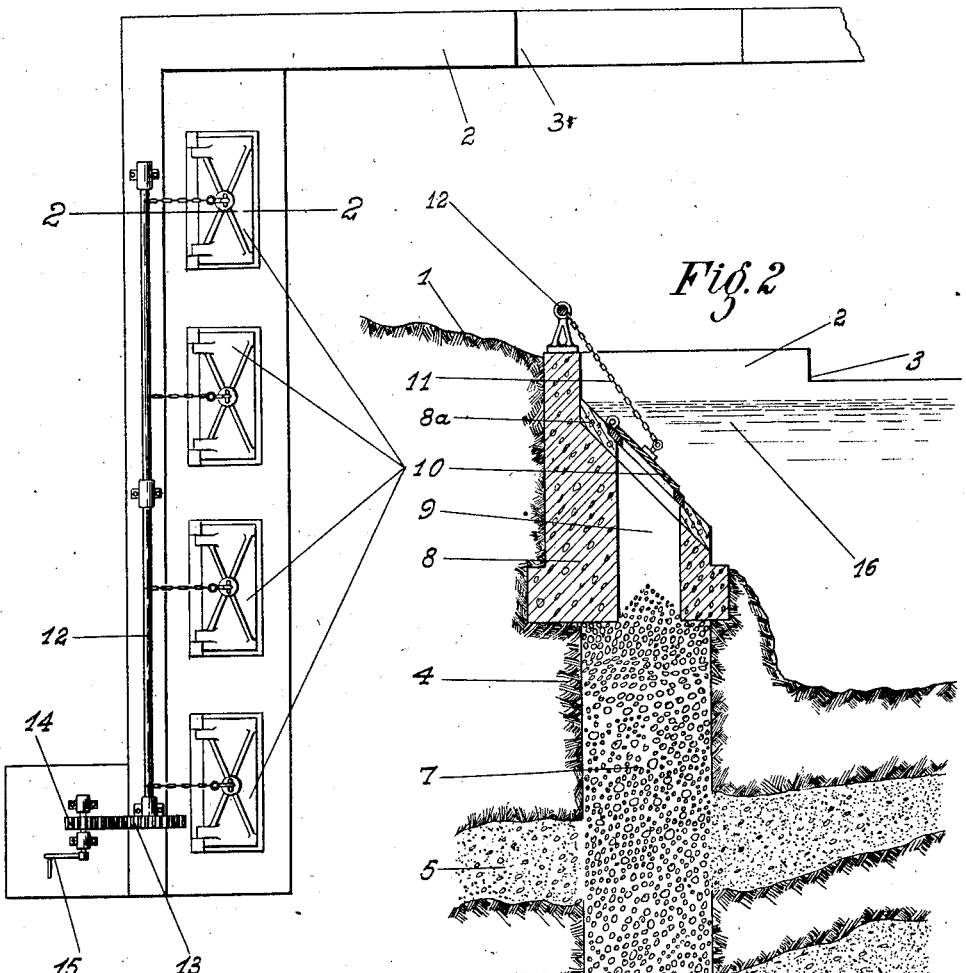
INVENTOR
George W. Enderson
BY
ATTORNEY Patented Apr. 30, 1929.

1,711,308

UNITED STATES PATENT OFFICE.

GEORGE W. ENDERSON, OF SAN JOSE, CALIFORNIA, ASSIGNOR OF ONE-HALF TO DANIEL B. WADE, OF SAN JOSE, CALIFORNIA.

APPARATUS FOR WATER RESERVATION.

Application filed August 8, 1925. Serial No. 48,967.

This invention relates to improvements for reserving flood waters and delivering them down into the under-ground strata of the ground so that the water in such strata will be available for pumping for irrigation at points below the reservation.

All over the country irrigation is being carried on in a large scale and the constant use of wells tends to exhaust the water supply in the underground-strata, and in some sections of the country the situation is becoming acute.

I have found out, after many years of study, that the underground strata are not receiving the full supply of water which they should from the creeks in the hills and mountains at flood stage for the reason that the creeks have been washed out and cut into the ground so deep that the water level falls below the feeders that are connected with the creek channels and the underground strata.

I aim by my present invention to form water reservations at points along the different creeks, and then by means of a pit structure to connect the reservation with the underground strata so that at flood stage of the water in the creeks the same will percolate down to the underground strata, thus aiding nature in keeping up the necessary supply of water to carry on down into the valleys for irrigation purposes.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a plan view of the retaining wall and pit mechanism used to carry out my water reservation idea.

Fig. 2 is a sectional view of the retaining wall and pit taken on a line 2—2 of Fig. 1.

Referring now more particularly to the characters of reference on the drawings, the numeral 1 designates the banks of a stream and in carrying out my improved method of water reservation I build a retaining wall 2 across the stream from bank to bank, said retaining wall having an overflow spillway 3 formed therein.

Back of the retaining wall 2 and preferably adjacent one bank of the stream I sink a pit 4 down into the wall so as to traverse through a plurality of underground water strata 5 and 6. This pit 4 may be of any suitable size, preferably about 8 x 25 feet, and after it is completed so as to cut across the underground strata I then fill the same with clean coarse gravel 7.

In the bed of the stream 1 at the top of the pit 4 I erect a bulkhead 8 having manholes 9 communicating with the pit 4 and over each manhole I hinge a suitable manhole cover 10.

Chains or cables 11 are connected with the manholes 10 and to a shaft 12 suitably journaled on the top of the bulkhead 8 and provided on its end with a suitable spur gear 13 or the like meshing with which is another pinion gear 14 operable by a crank handle 15. By means of the gearing and shaft mechanism described the chains 11 may be wound around the shaft 12 to open and close the manholes 10.

When the water 16 in the creek 1 reaches flood stage it will completely cover the floor $8^a$ on the bulkhead 8, which contains the manhole covers 10. This floor $8^a$ and the manholes 10 thereon are set at an angle of substantially 45° so as to prevent the settling of trash and other débris thereon. The manholes are allowed to remain closed until the water in the creek sufficiently clears so that there is no trash or other débris therein, whereupon the manholes are opened to allow the flood water in the creek to flow therein and into the pit 4 where it percolates through the clean gravel 7 and reaches the undercurrent water strata and flows therein. In this way the flood water may all be diverted to the underground strata, thus assisting nature in keeping these strata full of water, and this water will flow on down to the lower levels where it can be withdrawn by the irrigation pumps.

The feasibility of my method will be greatly appreciated when it is figured out that a pit 8 x 25 feet can supply enough water to the underground strata to equal two hundred twelve inch wells.

I feel that under my method the upper strata which are now almost exhausted will be supplied and other wells may be pushed down to the lower strata with a certainty that the water supply can be kept up to the pull of the pumps.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A means to provide for the creation of a water reserve comprising a draining pit lowered adjacent a natural flowing stream intermediate its ends to intersect underground water strata, and a retaining wall across the stream beyond the pit in the direction of flow of the water; the top of the pit being above the bottom of the stream but below the top of the wall.

2. A means to provide for the creation of a water reserve comprising a draining pit lowered in and at one side of a natural flowing stream, a retaining wall across the stream beyond the pit, and a bulk head at the top of the pit extending lengthwise of the stream, the top of the bulk head having a downward slope away from the adjacent side of the stream.

In testimony whereof I affix my signature.

GEORGE W. ENDERSON.